United States Patent [19]

Tsumura

[11] Patent Number: 4,796,141
[45] Date of Patent: Jan. 3, 1989

[54] DISC ASSEMBLY FOR A MAGNETIC DISC APPARATUS

[75] Inventor: Hideo Tsumura, Kamakura, Japan

[73] Assignee: Mitsubishi Denki Kabushiki Kaisha, Tokyo, Japan

[21] Appl. No.: 105,611

[22] Filed: Oct. 8, 1987

[30] Foreign Application Priority Data

Oct. 22, 1986 [JP] Japan .......................... 61-161994[U]

[51] Int. Cl.$^4$ .................. G11B 5/82; G11B 17/02; G11B 17/038
[52] U.S. Cl. ................................. 360/135; 360/98.07
[58] Field of Search ..................... 360/135, 133, 98

[56] References Cited

U.S. PATENT DOCUMENTS

| | | | |
|---|---|---|---|
| 4,224,648 | 9/1980 | Roling | 360/135 |
| 4,717,977 | 1/1988 | Brown | 360/135 |

OTHER PUBLICATIONS

Coles et al., "Combined . . . Device", IBM Tech Disc Bull, vol. 24, No. 1B, June 1981, PG 718–719.

Primary Examiner—Robert S. Tupper
Attorney, Agent, or Firm—Oblon, Fisher, Spivak, McClelland & Maier

[57] ABSTRACT

A disc assembly for a magnetic disc apparatus comprises a plurality of vertically arranged magnetic discs each having a central aperture, a rotating shaft which is inserted in the central aperture of each of the magnetic discs and which is connected to a rotating source to be driven together with the magnetic discs, spacers interposed between the magnetic discs, and a clamp attached onto a top surface of the shaft, wherein a temperature compensating disc having substantially the same outer diameter as the magnetic discs is mounted on the clamp in one piece.

7 Claims, 3 Drawing Sheets

DISC ASSEMBLY FOR A MAGNETIC DISC APPARATUS

BACKGROUND OF THE INVENTION

1. Field of the Invention

The present invention relates to a disc assembly for a magnetic disc apparatus. More particularly, it relates to a structure for mounting a temperature compensating disc in the magnetic disc apparatus.

2. Discussion of Background

Generally, a magnetic disc apparatus has a structure as shown in FIGS. 4 and 5. In the Figures, a symbol a designates generally a plurality of vertically arranged magnetic discs, a reference numeral $1(a_o)$ designates a temperature compensating disc used as a dummy disc which is the same as the magnetic discs, a numeral 2 designates a clamp, a numeral 3 designates a plurality of spacers, a numeral 4 designates a rotating shaft, a numeral 5 designates fitting screws, a numeral 6 designates a plurality of magnetic heads opposing the surfaces of the magnetic discs a, a numeral 7 designates ginbal supporters for supporting the magnetic heads 6, a numeral 9 designates an actuator which moves the magnetic heads onto predetermined tracks in the magnetic discs, a numeral 10 designates a base, a numeral 11 designates a cover and a numeral 12 designates a spindle motor as a ootating source.

The temperature compensating disc 1(a0) and the plural magnetic discs a are mounted on the rotating shaft 4 at an equivalent distance by means of the spacers 3. The temperature compensating disc 1(a0) is placed above the uppermost position of the magnetic discs a by means of the clamp 2 and the screws 5. A desired number of the magnetic heads 6 are provided depending on the number of the magnetic discs a1, a2, a3 . . . . One surface of each of the magnetic discs a is used as a servo surface for the magnetic discs having a high track density.

The operation of the conventional disc assembly will be described.

When the rotating source 12 reaches a predetermined constant speed, one of the magnetic heads 6 is brought to a predetermined track position of one of the magnetic discs by the actuator 9 on the basis of a servo track, whereby writing-in or reading-out of data is carried out.

In the magnetic disc apparatus of this kind, the actuator 9 as a heat radiating source and the rotating source 12 are attached to the base 10. Accordingly, the temperature of parts placed near the base 10 becomes high and the temperature of parts placed near the cover 11 becomes low. Since the cover 11 has good heat radiating properties, the temperature of the uppermost magnetic disc 1(a0) becomes lower than that of the second magnetic disc $a_1$ when a plurality of the magnetic discs are vertically arranged, with the consequence that difference in temperature distribution between the uppermost magnetic disc and the second magnetic disc takes place. Since the difference in temperature distribution occurs due to self-heat radiation, the temperature difference just after a power source is turned on is different from the temperature difference after a certain time is passed. As a result, difference in thermal expansion among the magnetic discs a, the ginbal supporters and the arm heads 8 for supporting the magnetic heads takes place to thereby cause an off-track phenomenon. Therefore, in the conventional disc assembly for the magnetic disc apparatus, the uppermost magnetic disc $a_0$ could not be used for a magnetic disc on which data is recorded, but was used as the temperature compensating disc 1.

Thus, in the conventional magnetic disc apparatus having the temperature compensating disc 1 which is not usuable as a data recording medium, the temperature compensating disc 1 occupies a space for a single magnetic disc a as the data recording medium. This results in reduction of the capacity of memory, or a long rotating shaft 4 in order to increase the number of the magnetic discs a, whereby the outer dimension of the magnetic disc apparatus becomes large.

SUMMARY OF THE INVENTION

It is an object of the present invention to provide a magnetic disc apparatus capable of increasing the capacity of memory corresponding to a single magnetic disc without increasing the outer dimension of the magnetic disc apparatus.

The foregoing and the other objects of the present invention have been attained by providing a disc assembly for a magnetic disc apparatus which comprises a plurality of vertically arranged magnetic discs each having a central aperture; a rotating shaft which is inserted in the central aperture of each of the magnetic discs and which is connected to a rotating source to be driven together with the magnetic discs; spacers interposed between the magnetic discs; and a clamp attached onto a top surface of the shaft, wherein a temperature compensating disc having substantially the same outer diameter as the magnetic discs is mounted on the clamp in one piece.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 to 3 show diagrams of an embodiment of the disc assembly for a magnetic disc apparatus according to the present invention wherein FIG. 1 is a front view partly broken of the disc assembly, FIG. 2 is an enlarged longitudinal cross-sectional view partly broken of the disc assembly showing especially how to fit a clamp, and FIG. 3 is a perspective view of the clamp;

FIGS. 4 to 6 show the conventional disc assembly for a magnetic disc apparatus wherein FIG. 4 is a front view of the disc assembly, FIG. 5 is an enlarged longitudinal cross-sectional view of the disc assembly showing especially a clamp, and FIG. 6 is a perspective view of the clamp: an FIG. 7 is a graph showing a relation of temperature between each adjacent magnetic discs.

DESCRIPTION OF THE PREFERRED EMBODIMENTS

Figure 1:
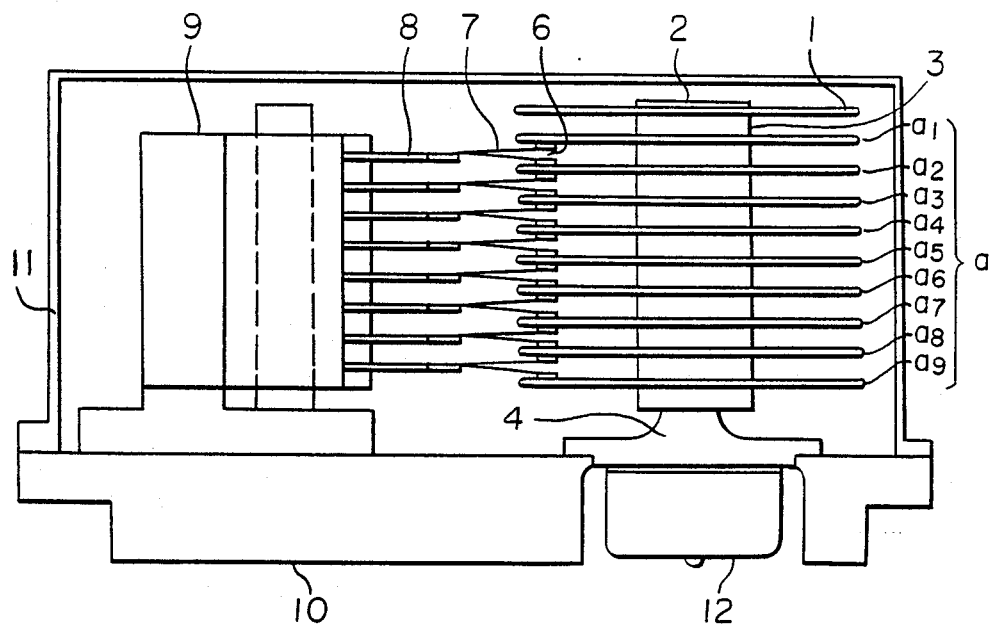
Figure 2:
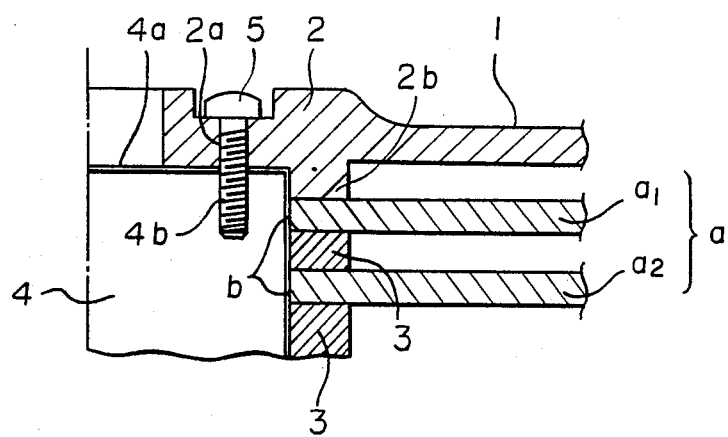
Figure 3:
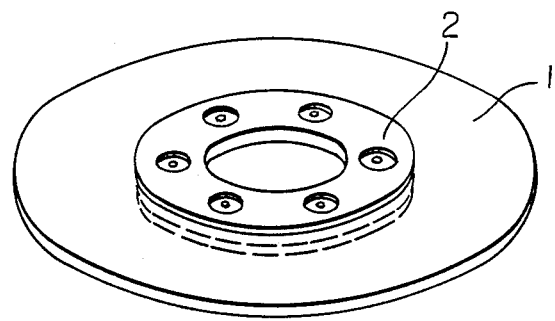
Figure 4:
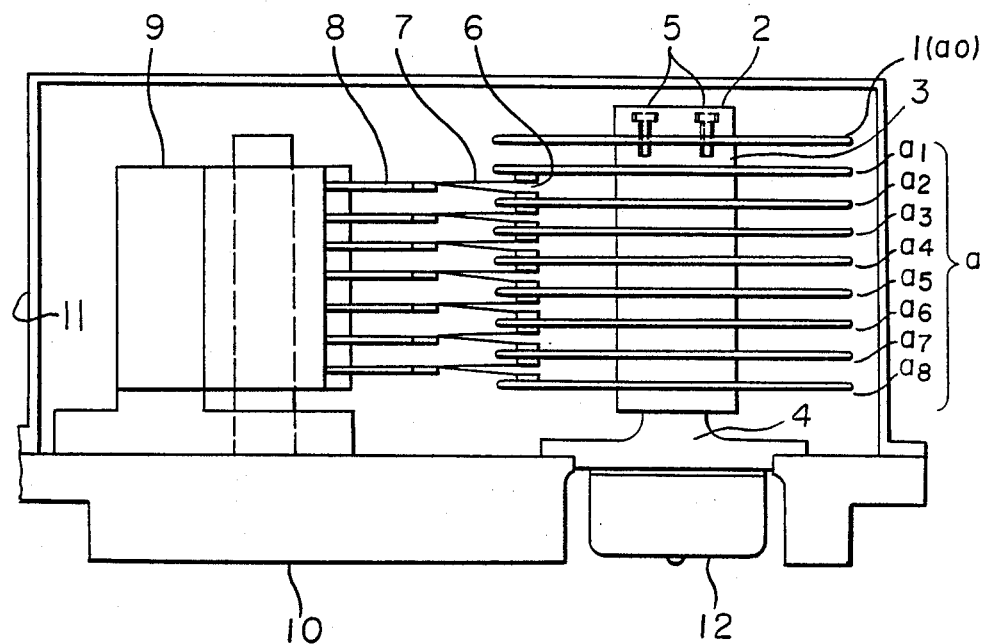
Figure 5:
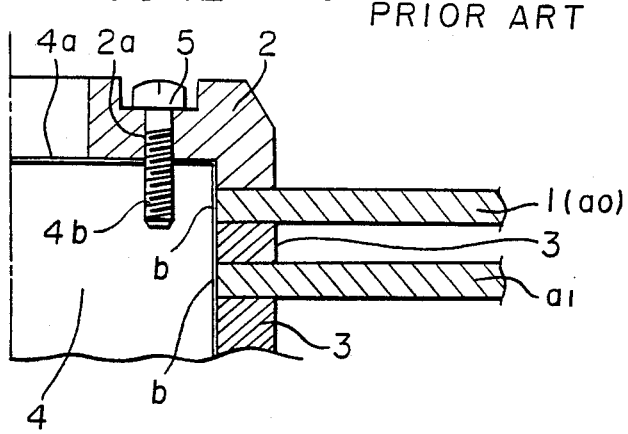
Figure 6:
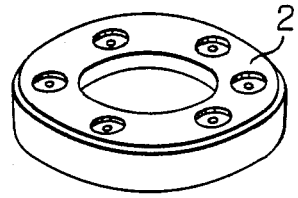
Figure 7:
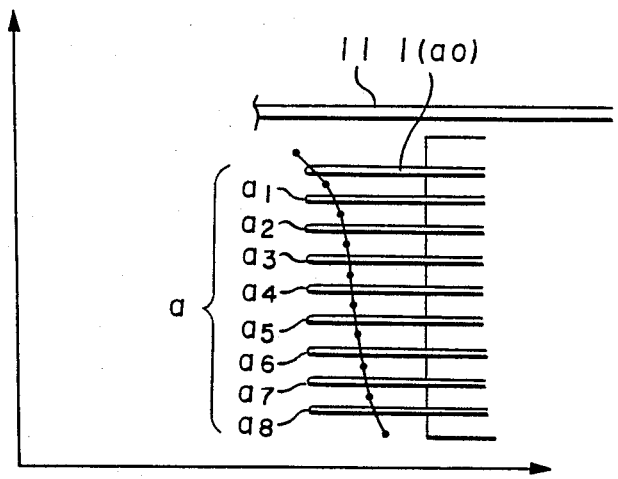

Referring now to the drawings, wherein the same reference numerals designate the same or corresponding parts throughout the several views, and more particularly to FIGS. 1 to 3 thereof, there is shown an embodiment of the disc assembly for a magnetic disc apparatus according to the present invention.

As similar to the conventional magnetic disc apparatus, a plurality of a circular magnetic discs each having a central opening b are vertically arranged on the rotating shaft 4 which is rotated by a spindle motor 10 as a rotating source in such a manner that a plurality of ring-shaped spacers 3 having an inner opening which has the same diameter as that of the central opening b of the magnetic disc are alternately interposed between the adjacent magnetic discs a, a. A clamp 2 is fitted to the top surface 4a of the rotating shaft 4 so as to press and hold the uppermost magnetic disc $a_1$. The clamp 2 comprises a ring-shaped frame body 2b to press the inner circumference of the uppermost magnetic disc $a_1$ and a plurality of through holes 2a at its inner circumference. Screws 5 are passed through the through holes 2a to be engaged with threaded holes 4b formed in the top surface 4a of the rotating shaft 4.

A temperature compensating disc is formed integrally with the clamp 2 so as to radially extend from the outer circumference of the clamp 2. The upper surface of the temperature compensating disc is flush with the upper surface of the clamp 2 even though there is a step portion between the upper surfaces of them in FIGS. 1 and 2. The temperature compensating disc 1 has the same outer diameter as the magnetic discs a and is made of a material having at least the same temperature radiation as the magnetic discs a.

The function of the disc assembly of the present invention will be described.

In the above-mentioned embodiment, a space to be occupied by the temperature compensating disc 1 as in the conventional disc assembly can be utilized by forming the temperature compensating disc 1 integrally with the clamp 2. Thus, a sheet of the magnetic disc a can be put in the vacant space which is formed by attaching the temperature compensating disc 1 integrally with the clamp 2, whereby the total capacity of memory can be increased. Otherwise, when it is unnecessary to increase the number of the magnetic discs a, the length of the rotating shaft 4 can be reduced, whereby the outer dimension of the magnetic disc apparatus can be reduced to thereby provide a small-sized magnetic disc apparatus.

For the above-mentioned embodiment in which the temperature compensating disc 1 is formed integrally with the clamp 2, the temperature compensating disc 1 is prepared separate from the clamp 2, and thereafter they are firmly attached in one piece. This embodiment unnecessitates a complicated shaping mold to thereby reduce a manufacturing cost.

Thus, in accordance with the present invention, a sheet of the magnetic disc a can be increased by forming the temperature compensating disc integrally with the clamp. Accordingly, the capacity of memory can be increased without changing the dimension of the magnetic disc apparatus.

Obviously, numerous modifications and variations of the present invention are possible in light of the above teachings. It is therefore to be understood that within the scope of the appended claims, the invention may be practiced otherwise than as specifically described herein.

What is claimed is:

1. A disc assembly for a magnetic disc apparatus which comprises:
   a plurality of vertically arranged magnetic discs each having a central aperture;
   a rotating shaft which is inserted in the central aperture of each of said magnetic discs and which is connected to a rotating source to be driven together with said magnetic discs;
   spacers interposed between said magnetic discs; and a clamp attached onto a top surface of said rotating shaft, wherein a temperature compensating disc having substantially the same outer diameter as said magnetic discs is mounted on said clamp in one piece.

2. The disc assembly according to claim 1, wherein said temperature compensating disc is made of the same material as said magnetic discs.

3. The disc assembly according to claim 1, wherein said temperature compensating disc is molded integrally with said clamp.

4. The disc assembly according to claim 1, wherein said temperature compensating disc as a separate body is firmly attached to said clamp.

5. The disc assembly according to claim 1, wherein said temperature compensating disc extends radially from the outer ciccumference of said clamp.

6. The disc assembly according to claim 1, wherein said clamp is provided with a plurality of through holes through which screws to be engaged with threaded holes formed in the top surface of said shaft are passed.

7. The disc assembly according to claim 1, wherein said clamp is provided with a ring-shaped frame which presses the inner circumference of the uppermost magnetic disc among said vertically arranged magnetic discs.

* * * * *